United States Patent Office 2,844,629
Patented July 22, 1958

2,844,629
FATTY ACID AMIDES AND DERIVATIVES THEREOF

William F. Bruce, Havertown, and Roy S. Hanslick, Philadelphia, Pa., assignors to American Home Products Corporation, New York, N. Y., a corporation of Delaware No Drawing. Application April 25, 1956
Serial No. 580,454

8 Claims. (Cl. 260—561)

This invention relates to chemical compounds of the amide type and, more particularly, to alkanolamino-di-fatty acid amides, their salts, and methods for producing them.

The compounds of the invention, in the form of the free bases, may be represented by the formula:

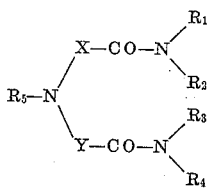

wherein $R_1$, $R_2$, $R_3$ and $R_4$ represent alkyl or alkene radicals in which the number of carbon atoms of all four radicals together total from 12 to 26, while $R_5$ represents either hydroxyalkyl radicals having from 2 to 4 carbon atoms, the lower aliphatic acid esters, specifically the butyrates and lower, or the nicotinic acid esters, of said hydroxyalkyls. The designations X and Y are intended to stand for divalent lower alkylene radicals of 1 to 2 carbon atoms.

It has been discovered that compounds meeting the described qualifications, whether as free bases or the acid-addition salts, demonstrate at least one, but often multiple, pharmacological actions. However, all show surprisingly good local anesthetic action. This pharmacological action has been noted for hydroxy-substituted compounds and specific esters thereof. With regard to the stated limits of carbon atom content for $R_1$, $R_2$, $R_3$ and $R_4$ radicals, it has been found that when the total is below 12, the local anesthetic action appears lost, while a total above 26 results in such difficultly soluble compounds, even with solubilizing agents, as to make them of little practical value for the particular use contemplated. Additionally, where $R_5$ involves a straight-chain alkylene group of more than 4 carbon atoms, no local anesthetic action could be found. On the other hand, good local anesthetic action was found where $R_5$ represented a lower alkanol and, similarly, when specific aliphatic or heterocyclic acid esters of the same compounds were tested. Another action found, in addition to local anesthetic action, is antispasmodic activity.

Compounds falling within the scope of the formula as given above may be used in the form of their acid-addition salts while still retaining their effectiveness for local anesthetic use. The salts provide great flexibility in therapeutic use since they may impart various degrees of water-solubility to an otherwise substantially insoluble base. With regard to the acid-addition salts, either organic or inorganic acids may be used as long as they do not substantially increase the toxicity of the compound. Among the salts considered useful for the purposes indicated are the hydrochloride, sulfate, phosphate, hydrobromide, acetate, tartrate, propionate or succinate.

In preparing the di-fatty acid amides, where the amides are similar, the free bases are prepared by reacting a lower alkanolamine with an alpha-halo-fatty acid amide in a molar ratio of 1:2, but preferably the latter being present in slight excess of this ratio. On the other hand, where the fatty acid amides are dissimilar as, for example, where X and Y are different alkylene radicals or where $R_1$ differs from $R_3$, the bases are prepared by reacting an alkanolamino-fatty acid amide with a halo-fatty acid amide in a molar ratio of about 1:1. The halogen atom may be either chlorine or bromine. The alkanolamino-fatty acid amide is prepared as taught by the general procedure outlined in the patents to Bruce et al., 2,516,674, dated July 25, 1950, or 2,568,142, dated September 18, 1951, suitably modified, of course, to provide the proper amine and halogenated reactants.

The reaction of the alkanolamine or alkanolamino-fatty acid amide and halo-fatty acid amide is carried out substantially under the conditions as described in the above-mentioned patents. The reaction temperature is in the range of about 80° to about 200° C. but is preferably in the narrower range of about 100 to about 180° C. Alcohols of 3 to 7 carbon atoms, anisole, dioxane, hydrocarbon solvents, such as xylene, or, in fact, any inert solvent boiling within the ranges indicated are suitable, the reaction taking place at the refluxing temperature of the solvent. Acid acceptors or mildly basic material are also provided for the reaction, these acceptors being, for example, pyridine, an alkali or alkaline earth metal oxide, carbonate or bicarbonate or like substances.

The esters are easily formed from the alkanol compounds by known procedures. Typical methods involve reacting the alkanol di-fatty acid amide with an acid or acid anhydride, the latter being preferred. The reaction is carried out in a suitable inert solvent, such as hydrocarbon or chlorinated hydrocarbons, typical examples being benzene, toluene and chloroform. An alkaline material may be provided for the reaction, if necessary, this being either alkali metal hydroxide or carbonate. The temperature for esterification depends on the reactants and may range from about 0° to about 150° C.

The salts may be prepared in any manner known to one skilled in the art. For acid-addition salts, one generally dissolves the free base in a suitable solvent and adds the selected acid thereto. The preparation of acid-addition salts is well known and need not be described here.

The following examples illustrate the preparation of typical compounds falling within the scope of the invention.

EXAMPLE 1

Beta-hydroxyethylamino-bis-(N,N-diisopropylacetamide)

In 1500 cc. of toluene containing 6.2 grams (6 mols) of diisopropylamine at —30° C. was added dropwise a mixture of 339 g. (3 mols) of chloracetyl chloride in 500 cc. of toluene. After the addition, the mixture was allowed to warm slowly to room temperature and stood overnight. The solid amine salt was filtered off and the filtrate distilled. The alpha-chloro-N,N-diisopropyl acetamide was collected between 90°–100° C. at 3 mm. Hg. The product was redistilled at the same pressure and solidified on standing, M. P. 48°–50° C. Yield 195 g.

Analysis.—Calc.: C, 54.3; H, 9.05; N, 7.93; Cl, 20.0. Found: C, 54.46; H, 9.00; N, 7.16; Cl 19.5.

In a 500 cc. flask with 160 cc. n-butyl alcohol and 60 g. anhydrous potassium carbonate was put 6.1 gm. (1 mol) of ethanolamine and 35.4 gm. (.2 mol) of alpha-chloro-N,N-diisopropyl acetamide. This mixture was refluxing at 115° C. for 24 hours. It was then filtered. The residue was washed with butyl alcohol and the filtrate was dried over magnesium sulphate. The butyl alcohol was removed in a vacuum and the residue solidified. The product was crystallized from benzene with the addition of hexane. The final product, obtained as a base, was a white powder, M. P. 119°– 121° C. The picrate was formed and had a M. P. of 154°–155° C.

*Analysis.*—Calc.: N, 14.7; found: N, 15.0. The hydrochloride had a M. P. of 238–240° C.

EXAMPLE 2

*Beta-hydroxyethylamino-bis-(N,N-di-n-amyl acetamide)*

Di-n-amylamine (157.3 gm.) (1.0 mole) is dissolved in dry toluene (1500 cc.). The solution is cooled to −20° C. to −25° C. and stirred as a solution of chloroacetylchloride (113 gm.) (1.0 mole) and 250 cc. of dry benzene is added slowly. Upon complete addition, the stirring of the solution is continued until the temperature rose to that of room temperature. The solid is separated and the toluene solution after being three times washed with water is dried over anhydrous magnesium sulfate. The liquid layer is then distilled and the fraction boiling at 132–134° C./1.5 mm. is collected as product: chloro-N-di-n-amylacetamide.

Chloro - N - di - N - amylacetamide (35.0 gm.) (0.15 mole) is added to 150 cc. of dry n-butanol containing mono-ethanolamine (4.6 gm.) (0.075 mole) and 50 gm. of anhydrous potassium carbonate. The mass is stirred and heated under reflux for approximately eighteen hours. Upon cooling, the solid is separated and the butanol solution is washed with five percent aqueous sodium carbonate solution and then three times with 50 cc. of water. The solution is dried over anhydrous magnesium sulfate, then vacuum distilled to remove butanol, and the fraction distilling at 230–235° C./1 mm. is collected as product. Yield 37%.

*Analysis.*—Nitrogen: Cal., 9.2%; found 8.9%.

EXAMPLE 3

*Beta-hydroxyethylamino-bis-(N,N-di-n-butyl propion amide)*

Chloro-N-di-n-butyl propionamide is prepared in the usual manner is described above except that di-n-butylamine and β-chloro propionyl chloride are used. The fraction distilling at 120–123° C/1 mm. is collected as product.

Chloro-N-di-n-butyl propionamide (43.9 gm.) (0.2 mole) is added to 150 cc. of dry n-butanol containing monoethanolamine (6.1 gm.) (0.1 mole) and 60 gm. of anhydrous potassium carbonate. The mass is stirred and heated under reflux for approximately eighteen hours. Upon cooling, the solid is filtered off, and the butanol solution is washed with five percent aqueous sodium carbonate solution and then three times with 50 cc. portions of water. The solution is dried over anhydrous magnesium sulfate, then vacuum distilled to remove butanol and the fraction distilling the 180–183° C./1 mm. is collected as product. Yield 61%.

*Analysis.*—Nitrogen: Calc., 9.8%; found 9.9%.

EXAMPLE 4

*Beta-hydroxyethylamino-bis-(N,N-di-n-butyl acetamide)*

Chloro-N-di-n-butyl acetamide is prepared in the usual manner as described in Example 2 except that di-n-butylamine is used. The fraction distilling at 124–126° C./1 mm. is collected as product. Yield 77%.

Chloro-N-di-n-butyl acetamide (41.1 gm.) (0.2 mole) is added to 150 cc. of dry n-butanol containing mono-ethanolamine (6.1 gm.) (0.1 mole) and 50 gm. of anhydrous potassium carbonate. The mass is stirred and heated under reflux for approximately eighteen hours. Upon cooling, the solid is separated and the butanol solution is washed with five per cent aqueous sodium carbonate solution and then three times with 50 cc. portions of water. The solution is dried over anhydrous magnesium sulfate, then vacuum distilled to remove butanol and the fraction distilling at 208–211° C./1 mm. is collected as product. Yield 38%.

*Analysis.*—Nitrogen: Calc., 10.5%; found 10.2%.

EXAMPLE 5

*2-hydroxy-n-propylamino-bis-(N,N-di-n-butyl acetamide)*

Chloro-N-di-n-butyl acetamide (41.1 gm.) (0.2 mole) is added to 150 cc. dry n-butanol containing isopropanolamine (7.5 gm.) (0.1 mole) and 50 gm. of anhydrous potassium carbonate. The mass is stirred and heated under reflux for approximately eighteen hours. Upon cooling, the solution is filtered, washed with five percent aqueous sodium carbonate solution and then three times with 50 cc. portions of water. The solution is dried over anhydrous magnesium sulfate, then vacuum distilled to remove butanol and the fraction distilling at 195–198° C./0.5 mm. is collected as product. Yield 38%.

*Analysis.*—Nitrogen: Calc., 10.1%; found, 9.6%. Found: 10.08%.

EXAMPLE 6

*Gamma hydroxy-n-propylamino-bis-(N,N-di-isobutyl acetamide)*

Chloro-N-di-isobutyl acetamide is prepared in the usual manner as described in Example 2 except that the di-isobutylamine is used in place of di-n-amylamine.

Chloro-N-di-isobutyl acetamide (B. P. 105° C.) (1.5 mm.) (41.1 gm.) (0.2 mole) is added to 150 cc. dry n-butanol containing 3-amino-propanol-1 (7.5 gm.) (0.1 mole) and 50 gm. of anhydrous potassium carbonate. The mass is stirred and refluxed for approximately eighteen hours. Upon cooling, the solution is filtered, washed with five percent aqueous sodium carbonate solution and then three times with 50 cc. portions of water. The solution is dried over anhydrous magnesium sulfate, then vacuum distilled to remove butanol and the fraction distilling at 205–210° C./1 mm. is collected as product. Yield 35%.

*Analysis.*—Nitrogen: Cal., 10.1%; found, 9.9%.

EXAMPLE 7

*Beta-hydroxyethylamino-bis-(N,N-di-isobutylacetamide)*

Chloro-N-di-isobutylacetamide (102.5 gm.) (0.5 mole) is added to dry n-butanol 150 cc.) containing ethanolamine (15.3 gm.) (0.25 mole) and anhydrous potassium carbonate (138 gm.). The mixture is stirred and refluxed for eighteen hours. Upon cooling the solution is filtered and the residue is washed with n-butanol. The combined filtrates are washed once with 5% aqueous sodium carbonate solution, then three time with water and finally dried over anhydrous magnesium sulfate. After filtering, the clean solution is vacuum distilled collecting as product B. P. 189–190° C./1 mm. Field 30%.

EXAMPLE 8

*Bis-[2,2-(di-iso butyl acetamido)]-3- amino-n-propyl acetate*

Gamma-hydroxy-n-propylamino-bis - (N,N-di-iso butyl acetamide) (12.4 gm.) (0.03 mole) is added to dry toluene (300 cc.) containing acetic anhydride (15.3 gm.) and anhydrous potassium carbonate 10.5 gm.). The mixture is stirred and refluxed for two hours. Upon cooling the solution is filtered and the residue is washed with dry toluene. The filtrates are vacuum distilled collecting as product boiling at 190–192° C./0.5 mm. Obtained 9.6 gm. Yield 70%.

*Analysis.*—Calc.: Carbon, 65.98%; found, 65.67%. Calc.: Hydrogen, 10.55; found, 10.37%.

EXAMPLE 9

*Bis-[2,2(di-isobutylacetamido)]-2 amino ethyl acetate*

Beta - hydroxyethylamino bis - (N,N - di - isobutylacetamide) (12.0 gm.) (0.03 mole) is added to dry toluene (300 cc.) containing acetic anhydride (15.3 gm.) (0.15 mole) and anhydrous potassium carbonate (10.2 gm.). The mixture is stirred and refluxed for two hours. Upon cooling the solution is filtered and the residue is washed with dry toluene. The filtrates are vacuum distilled to remove toluene and unreacted acetic anhydride. The residue is a viscous liquid.

*Analysis.*—Calcd.: Carbon, 65.0%; found, 64.78%. Calc.: Hydrogen, 10.6%; found, 10.45%.

Its hydrochloride salt:

*Analysis.*—Calc.: Nitrogen, 8.78%; found, 8.66%.

EXAMPLE 10

*Beta-hydroxyethylamino-N,N-di-isobutyl-N',N'-diethyl acetamide*

Beta - hydroxyethylamino - N,N - di - isobutylacetamide (14.0 gm.) (0.06 mole) is added to dry n-butanol containing chloro-N,N-diethyl acetamide (9.2 gm.) (0.06 mole) and anhydrous potassium carbonate (50 gm.). The mixture is stirred and refluxed for eighteen hours. Upon cooling the solution is filtered and the residue is washed with n-butanol. The combined filtrates are washed once with five percent aqueous sodium carbonate solution, then three times with water and finally dried over magnesium sulfate. After filtering, the solution is vacuum distilled, collecting as product B. P. 175–177° C./0.3 mm. Obtained 9.7 gm. Yield 47%.

*Analysis.*—Calc.: Carbon, 63.3%; found, 63.5%. Calc.: Hydrogen, 10.8%; found, 10.7%.

EXAMPLE 11

*Beta-hydroxyethylamino-N,N-di-n-butyl-N',N'-diethyl acetamide*

Beta - hydroxyethylamino - N - di - n - butylacetamide (23.0 gm.) (0.1 mole) is added to dry n-butanol (150 cc.) containing chloro-N-diethyl acetamide (15.0 gm.) (0.1 mole) and anhydrous potassium carbonate (50 gm.) The mixture is stirred and refluxed for eighteen hours. Upon cooling the solution is filtered and the residue is washed with n-butanol. The combined filtrates are washed once with five percent aqueous sodium carbonate solution, then three times with water and finally dried over magnesium sulfate. After filtering, the solution is vacuum distilled collecting as product B. P. 203–205° C./1 mm. Obtained 10.3 gm. Yield 30%.

*Analysis.*—Nitrogen: Calc., 12.2%; found, 11.9%.

EXAMPLE 12

*Bis-[2,2-(di-n-butylacetamido)]-2-aminoethyl nicotinate*

Beta hydroxy ethyl amino-bis-(N,N-di-n-butyl acetamide) (12.0 gm.) (0.03 mole) is added to dry benzene (125 cc.) containing nicotinic anhydride (6.84 gm.) (0.03 mole). The mixture is stirred and refluxed for ten hours. Upon cooling the solution is filtered and the residue is washed with dry benzene. The benzene is removed and to the residue ether is added. The solution is filtered to remove a small quantity of solids. Dry hydrogen chloride gas is passed into the ether solution to precipitate the ester-hydrochloride. M. P. 206–207° C. Obtained 6.1 gm. Yield 40%.

*Analysis.*—Nitrogen: Calc., 9.5%; found, 9.0%.

EXAMPLE 13

*Beta-hydroxyethylamino-N,N-di-isobutyl-N',N'-diallylacetamide*

Diallylamine 97 grams (1 mol) is added to 600 cc. dry toluene. The solution is chilled in a dry ice bath and then chloracetyl chloride 56 gm. (.5 mol) is added to the solution with constant stirring. After the addition, let stand overnight. The solution mixture is then filtered and the filtrate is water washed three times and dried over anhydrous magnesium sulfate. The solution is filtered and vacuum distilled to remove toluene and collect as product chlor-N,N-diallyl acetamide, B. P. 115–117° C. at 1 mm. Hg. Yield 66.6%.

Chloro-di-allyl acetamide (19.0 gm.) (0.11 mole) is added to dry n-butanol (150 cc.) containing beta-hydroxy ethyl amino-N-di-isobutylacetamide (23.0 gm.) (0.1 mole) and anhydrous potassium carbonate (50 gm.). The mixture is stirred and refluxed for eighteen hours. Upon cooling, the solution is filtered and the residue is washed with n-butanol. The combined filtrates are washed once with five percent aqueous sodium carbonate solution, then three times with water and finally dried over anhydrous magnesium sulfate. After filtering, the solution is vacuum distilled, collecting as product B. P. 198–200° C./0.5 mm. Yield 50%.

*Analysis.*—Nitrogen: Calc., 11.4%; found, 10.7%.

EXAMPLE 14

*Beta-hydroxyethyl amino-bis-(N-ethyl-N-n-butyl-acetamide)*

Ethyl n-butylamine (100 gm.) (1.0 mole) is added to dry toluene (1500 cc.) containing triethylamine (110 gm.). The solution is cooled to −20 to −25° C. whereupon chloroacetylchloride (113 gm.) (1.0 mole) is added slowly. The mixture is stirred during the entire addition of chloroacetyl chloride and during the time required for the reaction mixture to reach room temperature. The toluene solution is filtered and the solid residue is washed with dry toluene. The combined filtrates are water washed three times, then dried over anhydrous magnesium sulfate. After filtering, the toluene is distilled off. Upon vacuum distillation collect as product chloro-N-ethyl-N-n-butyl acetamide. B. P. 115° C./1 mm. Yield 83%.

Chloro-N-ethyl-N-n-butyl acetamide (35.5 gm.) (0.2 mole) is added to dry n-butanol (150 cc.) containing ethanolamine (6.1 gm.) (0.1 mole) and anhydrous potassium carbonate (50 gm.). The mixture is stirred and refluxed for eighteen hours. Upon cooling, the solution is filtered and the residue is washed with n-butanol. The combined filtrates are washed with five percent aqueous sodium carbonate solution, then three times with water and finally dried over anhydrous magnesium sulfate. After filtering, the solution is vacuum distilled, collecting as product B. P. 198–199° C./0.5 mm. Yield 62%.

*Analysis.*—Nitrogen: Calcd., 12.2%; found, 11.8%.

EXAMPLE 15

*Bis-[N-ethyl-N-n-butyl acetamido]-2-aminoethyl nicotinate-dihydrochloride*

Beta-hydroxyethylamino bis-(N-ethyl-N-n-butyl acetamide) (5.2 gm.) (0.015 mole) is added to dry benzene (100 cc.) containing nicotinic anhydride (3.4 gm.) (0.015 mole). The mixture is stirred and refluxed for eight hours. Upon cooling, the solution is filtered to remove nicotinic acid. The solution is then vacuum distilled to remove benzene. To the solid slurry remaining, add ether and filter off a small amount of additional nicotinic acid. The ether solution is dried over anhydrous magnesium sulfate; filtered, and to the ether solution is added dry hydrogen chloride to precipitate the nicotinic ester-di-hydrochloride. M. P. 212–213° C. Yield 29.4%.

EXAMPLE 16

*Hydroxytertiarybutyl amino-bis-(N-n-butyl-N-ethyl-acetamide)*

Chloro-N-ethyl-N-n-butyl acetamide (17.75 gm.) (0.1 mole) is added to dry n-butanol (150 cc.) containing 2-amino-2-methyl-propanol-1 (4.45 gm.) (0.05 mole) and anhydrous potassium carbonate (50 gm.). The mixture is stirred and refluxed for eighteen hours. Upon cooling, the solution is filtered and the solid residue is washed with butanol. The combined filtrates are washed once with five percent aqueous sodium carbonate solution, then three times with water and finally dried with anhydrous magnesium sulfate. After filtering, the solution is vacuum distilled, collecting as product B. P. 170–173° C./1 mm. Yield 11.3%.

Analysis.—Nitrogen: Calc., 11.3%; found, 11.2%.

EXAMPLE 17

*Beta-hydroxyethylamino-bis-(N-n-dodecyl-N-methylacetamide)* n-Dodecylamine (37.0 gm.) (0.2 mole) is mixed with ethyl formate (14.8 gm. plus 20 excess) and warmed on the steam bath for thirty minutes. The solution is then cooled for crystallization. M. P. 35–36° C. If crystallization does not occur, remove ethanol and excess ethyl formate under vacuum until a solid remains which is formyl n-dodecylamine.

Formyl n-dodecylamine (85.0 gm.) (0.4 mole) is dissolved in dry ether (500 cc.) to which is then added lithium aluminum hydride (15.2 gm.) (0.4 mole). The mixture is stirred and gently refluxed for six hours, then cooled in an ice-water bath, whereupon sufficient water is added dropwise to decompose and dissolve the inorganic salts. The ether layer is removed and dried over anhydrous magnesium sulfate and then distilled collecting as product B. P. 110–112° C./2 mm. Overall yield of n-dodecyl methylamine 32%.

Analysis.—Nitrogen: Calc., 7.0%; found 7.1%.

n-Dodecyl methylamine (25.5 gm.) (0.1275 mole) is dissolved in dry toluene (200 cc.). The solution is cooled to −20 to −25° C. and stirred as a solution of chloracetyl chloride (14.3 gm. plus 10% excess) in dry toluene (100 cc.) is added slowly. Upon complete addition, the stirring is continued allowing the temperature to rise to that of the room. The solution is filtered and washed three times with water and finally dried over anhydrous magnesium sulfate. The liquid layer is then vacuum distilled and the fraction boiling at 166–167° C./1 mm. is collected as product: Chloro-N-n-dodecyl-N-methyl acetamide.

Analysis.—Nitrogen: Calc., 5.0%; found, 5.08%. Yield 35%.

Chloro-N-n-dodecyl-N-methyl acetamide (11.1 gm.) (0.04 mole) is added to 50 cc. of dry n-butanol containing mono-ethanolamine (1.2 gm.) (0.02 mole) and fifteen grams of anhydrous potassium carbonate. The mass is stirred and heated under reflux for approximately eighteen hours. Upon cooling, the solid is filtered and the alcohol solution is washed with five percent aqueous sodium carbonate solution and three times with 50 cc. of water. The solution is dried over anhydrous magnesium sulfate, then distilled to remove butanol and the fraction distilling at 225–227° C./1 mm. is collected as product. Yield 20%.

Analysis.—Nitrogen: Calc., 7.78%; found, 7.4%.

EXAMPLE 18

*Beta-hydroxyethylamino-bis-(N,N-di-n-hexylacetamide)* n-Di-hexylamine (74.0 gm.) (0.4 mole) is dissolved in dry toluene (500 cc.). The solution is cooled to −20 to −25° C. and stirred as a solution of chloracetyl chloride (22.6 gm.) (0.2 mole) in 50 cc. of dry toluene is added slowly. Upon complete addition, the stirring of the solution is continued until the temperature rose to that of the room. The solid is separated and the toluene solution is water washed three times and then dried over anhydrous magnesium sulfate. The liquid layer is distilled and the fraction boiling at 175–176° C./6 mm. is collected as product. Yield 80% of chloro-di-n-hexyl acetamide.

Chloro-di-n-hexyl acetamide (26.2 gm.) (0.1 mole) is added to 150 cc. of dry n-butanol containing mono-ethanolamine (3.0 gm.) (0.05 mole) and fifty grams of anhydrous potassium carbonate. The mass is stirred and refluxed for approximately eighteen hours. Upon cooling, the solid is separated and the butanol solution is washed with five percent aqueous sodium carbonate solution followed with three water washes of 50 cc. each. The solution is dried over anhydrous magnesium sulfate and then vacuum distilled to remove butanol and the fraction distilling at 195° C./5 mm. is collected as product. Yield 72%.

Analysis.—Nitrogen: Calc., 8.22%; found, 8.15%.

EXAMPLE 19

*1,1,7,7-tetra-n-butyl-2,6-diketo-3,5-dimethyl-4-(β-hydroxy isopropyl)-1,4,7-triazaheptane*

Di-n-butylamine (51.6 gm.) (0.4 mole) is dissolved in 500 cc. of dry toluene. The solution is cooled to −20 to −25° C. and stirred as a solution of alpha chloro propionyl chloride (25.4 gm.) (0.2 mole) and 100 cc. of dry toluene is added slowly. Upon complete addition, the stirring of the solution is continued until the temperature of the reaction mixture is the same as that of the room. The solution is filtered, water washed three times and then dried over anhydrous magnesium sulfate. The liquid layer is distilled, collecting the fraction boiling at 138–140° C./13 mm. as alpha chloro-di-n-butyl propionamide. Yield nearly quantitative.

Alpha-chloro-di-n-butyl propionamide (22 gm.) (0.1 mole) is added to 100 cc. of dry n-butanol containing iso-propanolamine (3.75 gm.) (0.05 mole) and forty grams of anhydrous potassium carbonate. The mass is stirred and heated under reflux for eighteen hours. Upon cooling, the solid is separated and the butanol solution is washed with five percent aqueous sodium carbonate solution and then three times with 50 cc. of water. The solution is dried over anhydrous magnesium sulfate, then vacuum distilled, collecting the fraction boiling at 165–168° C./0.5 mm. Yield 10%.

Analysis.—Nitrogen: Calc., 9.51%; found, 9.57%.

EXAMPLE 20

*Bis-(N-n-butyl-N-ethyl acetamido)-3-amino-n-propyl n-butyrate*

Gamma hydroxy propylamino-bis-(N-ethyl-N-n-butyl acetamide) (5.0 gm.) (0.014 gm.) is added to dry toluene (150 cc.) containing butyric anhydride (6.5 gm.) (0.041 mole) and anhydrous potassium carbonate (6.0 gm.). The mixture is stirred and refluxed for three hours. Upon cooling, the solution is filtered and vacuum distilled to remove toluene and unreacted butyric anhydride, and collecting as product: B. P. 208–210° C./1 mm. Yield 68.6%.

Analysis.—Nitrogen: Calc., 9.8%; found, 9.76%. Carbon: Calc., 64.6%; found, 64.46%. Hydrogen: Calc., 10.5%; found, 10.43%.

Those compounds which can be solubilized in water only with difficulty may be utilized in an aqueous solution containing well-known solubilizing or surface-active agents, as for example, the long-chain fatty acid partial esters of hexitol anhydrides or the oxyalkylene derivatives thereof.

We claim:

1. A compound of the group consisting of di-fatty acid amides and the non-toxic, acid-addition salts thereof, said amides having the formula

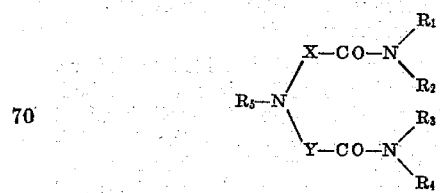

wherein $R_1$, $R_2$, $R_3$ and $R_4$ represent alkyl radicals in which the number of carbon atoms of the four radicals together total from 12 to 26 with no radical having more than 12 carbon atoms; while $R_5$ stands for a member of the group consisting of hydroxyethyl, hydroxypropyl, hydroxybutyl and the $C_2$ and $C_4$ lower alkyl acid esters thereof, while X and Y represent divalent alkylene radicals of 1 to 2 carbon atoms.

2. A compound having the formula

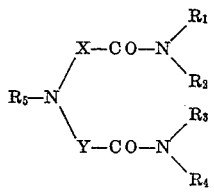

wherein $R_1$, $R_2$, $R_3$ and $R_4$ represent alkyl radicals in which the number of carbon atoms of the four radicals together total from 12 to 26 with no radical having more than 12 carbon atoms, $R_5$ stands for hydroxyalkyl having from 2 to 4 carbon atoms, while X and Y represent divalent alkylene radicals of 1 to 2 carbon atoms.

3. A compound having the formula

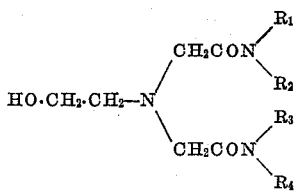

wherein $R_1$ and $R_2$ stand for lower alkyl radicals each having 2 to 6 carbon atoms, while $R_3$ and $R_4$ stand for lower alkyl radicals each having 4 to 6 carbon atoms.

4. The compound, beta-hydroxyethylamino-bis-(N,N-di-n-butyl acetamide).

5. The compound, beta-hydroxyethylamino-bis-(N,N-di-n-amyl acetamide).

6. The compound, 2-hydroxy-n-propylamino-bis-(N,N-di-n-butyl acetamide).

7. The compound, beta-hydroxyethylamino-bis-(N,N-di-isobutyl acetamide).

8. The compound, gamma-hydroxypropylamino-bis-(N,N-di-isobutyl acetamide).

References Cited in the file of this patent
UNITED STATES PATENTS 2,368,208    Epstein et al. _____ Jan. 30, 1945

UNITED STATES PATENT OFFICE

Certificate of Correction

July 22, 1958

Patent No. 2,844,629

William F. Bruce et al.

It is hereby certified that error appears in the printed specification of the above numbered patent requiring correction and that the said Letters Patent should read as corrected below.

Column 2, lines 64 and 65, for "(1 mol)" read —(.1 mol)—; column 3, line 22, for "Chloro-N-di-N-amylacetamide" read —Chloro-N-di-n-amylacetamide—; line 37, heading to Example 3, for "*propion*" read —*propion*-—; line 41, for "manner is" read —manner as—; line 55, for "distilling the" read —distilling at—; column 4, line 26, after the word "that" strike out "the"; line 45, for "150 cc.)" read —(150 cc.)—; line 51, for "time" read —times—; line 54, for "Field" read —Yield—; line 63, for "10.5 gm.)" read —(10.5 gm.)—; line 70, for "10.55" read —10.55%—; column 6, line 33, Example 14, for "chloro-N-ethyl-N-n-butyl acetamide" read —(chloro-N-ethyl-N-n-butyl acetamide)—; column 9, line 4, for "$C_2$ and $C_4$ lower alkyl" read —$C_2$ to $C_4$ lower alkyl—.

Signed and sealed this 14th day of October 1958.

[SEAL]

Attest:
KARL H. AXLINE,
Attesting Officer.

ROBERT C. WATSON,
Commissioner of Patents.